US008516950B2

(12) United States Patent
Scholz et al.

(10) Patent No.: US 8,516,950 B2
(45) Date of Patent: Aug. 27, 2013

(54) CENTRE ARM FOR HOLDING AN UPPER CONTACT GRILLING OR ROASTING PLATE AS WELL AS CONTACT GRILLING OR ROASTING DEVICE WITH SUCH A CENTRE ARM

(75) Inventors: Kay Scholz, Hamburg (DE); Otto Langguth, Tangstedt (DE); Karsten Anklam, Bargteheide (DE)

(73) Assignee: H.H. Scholz KG, Hamburg (DE)

( * ) Notice: Subject to any disclaimer, the term of this patent is extended or adjusted under 35 U.S.C. 154(b) by 1104 days.

(21) Appl. No.: 12/365,619

(22) Filed: Feb. 4, 2009

(65) Prior Publication Data

US 2010/0107895 A1 May 6, 2010

(30) Foreign Application Priority Data

Nov. 5, 2008 (DE) .......................... 10 2008 056 474

(51) Int. Cl.
*A47J 37/06* (2006.01)
(52) U.S. Cl.
USPC ................... 99/372; 99/349; 99/353; 99/375; 99/378; 99/400
(58) Field of Classification Search
USPC ................... 99/349, 353, 372, 375, 378, 379, 99/400, 425, 446, 426, 340, 369, 377, 391, 99/421 H, 421 HH, 421 V, 424
See application file for complete search history.

(56) References Cited

U.S. PATENT DOCUMENTS

| 1,697,384 A | 1/1929 | Coutu |
| 1,977,237 A | 10/1934 | Methe |
| 2,009,791 A | 7/1935 | Shroyer |
| 2,033,060 A | 3/1936 | Anderson |
| 2,039,218 A | 4/1936 | Govoroff |
| 2,547,982 A | 4/1951 | Sivley |
| 2,607,287 A | 8/1952 | Price |
| 2,718,842 A | 9/1955 | Klemm |
| 3,620,156 A | 11/1971 | Schindler et al. |

(Continued)

FOREIGN PATENT DOCUMENTS

| CH | 610 747 A5 | 5/1979 |
| DE | 839 393 C | 5/1952 |

(Continued)

OTHER PUBLICATIONS

Examination Report, dated Apr. 30, 2009, issued in corresponding German Application No. 10 2008 056 473.7-16.

(Continued)

*Primary Examiner* — Henry Yuen
*Assistant Examiner* — Ket D Dang
(74) *Attorney, Agent, or Firm* — Venable LLP; Robert Kinberg; Tamatane J. Aga (57) ABSTRACT

The invention concerns a center arm for holding an upper grilling or roasting plate, the center arm having a substantially vertical supporting section and a holding section which is arranged pivotably on the vertical supporting section and on which is arranged the upper grilling or roasting plate, which is distinguished in that the pivot shaft of the holding section is formed and arranged approximately at the point of intersection S of the center axes $M_1$ and $M_2$ of the holding section on the one hand and the supporting section on the other hand. Furthermore the invention concerns a contact grilling or roasting device having such a center arm.

7 Claims, 6 Drawing Sheets

(56) References Cited

U.S. PATENT DOCUMENTS

| | | | |
|---|---|---|---|
| 4,729,296 A | 3/1988 | Sabin | |
| 4,989,580 A | 2/1991 | Dunham | |
| 5,197,377 A | 3/1993 | Jennings et al. | |
| 5,341,727 A | 8/1994 | Dickson | |
| 5,423,253 A | 6/1995 | Olson et al. | |
| 5,531,155 A | 7/1996 | Pellicane et al. | |
| 5,619,907 A * | 4/1997 | Orgelmacher | 99/351 |
| 5,758,568 A | 6/1998 | Moravec | |
| 6,079,321 A | 6/2000 | Harter et al. | |
| 6,467,400 B2 | 10/2002 | Raio et al. | |
| 6,595,116 B1 * | 7/2003 | Lin | 99/349 |
| 6,782,804 B1 | 8/2004 | Lin | |
| 7,448,373 B2 | 11/2008 | Hill et al. | |
| 8,100,051 B2 * | 1/2012 | Scholz et al. | 99/351 |
| 2001/0042448 A1 | 11/2001 | Menektchiev et al. | |
| 2004/0123744 A1 * | 7/2004 | Bobo | 99/374 |
| 2010/0107894 A1 | 5/2010 | Scholz et al. | |
| 2010/0107895 A1 | 5/2010 | Scholz et al. | |
| 2010/0107896 A1 * | 5/2010 | Scholz et al. | 99/372 |
| 2010/0107897 A1 * | 5/2010 | Scholz et al. | 99/377 |

FOREIGN PATENT DOCUMENTS

| | | | |
|---|---|---|---|
| DE | 28 05 997 A1 | 8/1979 | |
| EP | 0 662 299 A1 | 7/1995 | |
| FR | 2 516 352 A1 | 5/1983 | |
| WO | WO-2008/093330 A2 | 8/2008 | |

OTHER PUBLICATIONS

Examination Report, dated Mar. 23, 2009, issued in corresponding German Application No. 10 2008 056 474.5-16.

Examination Report, dated Mar. 9, 2009, issued in corresponding German Application No. 10 2008 056 476.1-16.

International Search Report dated Apr. 22, 2010, issued in corresponding PCT Application No. PCT/EP2009/008052.

International Search Report dated Apr. 22, 2010, issued in corresponding PCT Application No. PCT/EP2009/008053.

International Search Report dated Apr. 22, 2010, issued in corresponding PCT Application No. PCT/EP2009/008054.

International Search Report dated Apr. 22, 2010, issued in corresponding for PCT Application No. PCT/EP2009/008055.

United States Notice of Allowance, issued in corresponding U.S. Appl No. 12/365,610, dated Sep. 30, 2011.

United States Non-Final Office Action, issued in corresponding U.S. Appl No. 12/365,637, dated Apr. 12, 2012.

United States Non-Final Office Action, issued in corresponding U.S. Appl No. 12/365,599, dated Mar. 27, 2012.

* cited by examiner

CENTRE ARM FOR HOLDING AN UPPER CONTACT GRILLING OR ROASTING PLATE AS WELL AS CONTACT GRILLING OR ROASTING DEVICE WITH SUCH A CENTRE ARM

CROSS-REFERENCE TO RELATED APPLICATIONS

This application claims the priority of German patent application DE 10 2008 056 474.5, filed on Nov. 5, 2008, the subject matter of which is incorporated herein by reference.

BACKGROUND OF THE INVENTION

The invention concerns a centre arm for holding an upper grilling or roasting plate, the centre arm having a substantially vertical supporting section and a holding section which is arranged pivotably on the vertical supporting section and on which is arranged the upper grilling or roasting plate. Furthermore, the invention concerns a contact grilling or roasting device having at least one upper contact grilling or roasting plate and a lower contact grilling or roasting plate, wherein the or each upper contact grilling or roasting plate is arranged pivotably on the lower contact grilling or roasting plate by a centre arm.

Centre arms of this kind are used in the field of contact grilling or roasting devices having at least two contact plates designed for contact with the material to be grilled or roasted. Such contact grilling or roasting devices are known e.g. from EP 0 662 299 B1 and include an upper contact grilling or roasting plate and a lower contact grilling or roasting plate, wherein the upper contact grilling or roasting plate is pivotably linked by a centre arm to the lower contact grilling plate. Associated with both contact plates is a unit which receives the wiring and has corresponding control elements, the unit usually being arranged below the two contact plates. The centre arm is usually in two parts. To put it another way, a centre arm element is mounted rigidly in the region of the lower contact grilling or roasting plate. A second centre arm element is arranged pivotably on the first centre arm element and holds the upper contact grilling or roasting plate.

The two contact grilling or roasting plates have a common pivot shaft. As a rule, the lower contact grilling or roasting plate is designed and arranged stationarily, while the upper contact grilling or roasting plate is designed and arranged so as to be pivotable on the lower contact grilling or roasting plate. For this purpose the centre arm element is arranged in the region of the upper contact grilling or roasting plate, namely a holding section, by means of the pivot shaft on the centre arm element with which the lower contact grilling or roasting plate is associated. The supporting section is of substantially linear design, while the holding section has a cranked shape. To put it another way, the holding section is approximately L-shaped, wherein the pivot shaft is arranged in the region of the short arm. This means that the pivot shaft is arranged eccentrically relative to the centre axis of the holding section. The pivot shaft is also arranged eccentrically in relation to the centre axis of the supporting section, namely at a distance from the centre axis in the direction of the lower contact grilling or roasting plate. This off-centre arrangement of the pivot shaft in relation to the centre axes of the centre arm does, however, have the drawback that firstly a considerable pivot range is produced, so that such a contact grilling or roasting device needs a free space in order to allow the free pivot movement. To put it another way, existing contact grilling or roasting devices cannot be positioned directly on a rear boundary, namely usually a wall or the like. Secondly, the whole construction in particular of the centre arm is unstable due to the leverage caused by the L-shape in relation to the pivot shaft. Another drawback lies in that additional functions such as for example devices for weight relief and/or devices for fixing the pivot movement can be produced only with very high expenditure on construction.

SUMMARY OF THE INVENTION

It is therefore the object of the present invention to provide a centre arm which eliminates the drawbacks known from the state of the art. It is also the object of the present invention to propose a corresponding contact grilling or roasting device.

This object is achieved by a centre arm having the features mentioned hereinbefore by the fact that the pivot shaft of the holding section is formed and arranged approximately at the point of intersection of the centre axes of the holding section on the one hand and the supporting section on the other hand. Due to the central arrangement of the pivot shaft, in a surprisingly simple manner a compact and stable design of the centre arm is achieved. In other words, the central arrangement of the pivot shaft ensures that the pivot range is greatly reduced and, by avoiding leverage, the rigidity of the centre arm is increased. Furthermore, the central arrangement assists centralisation and combining of additional functions within the contact grilling or roasting device.

An appropriate development of the invention is distinguished in that the pivot shaft is mounted in an inner housing of the holding section, wherein the inner housing is arranged within a housing of the holding section. Due to the arrangement of a first housing (inner housing) in a second housing (outer housing) and mounting of the pivot shaft in the inner housing, the rigidity of the centre arm is greatly increased, so that upper contact grilling or roasting plates of high weight can be received on the centre arm as well.

Preferably, within the supporting section is arranged a device for weight relief, the device for weight relief being mounted by link elements on the pivot shaft. With this design according to the invention, several functions of the centre arm, namely the actual pivot movement and weight relief, are produced on a common pivot shaft, which reduces the number of parts and simplifies the construction.

Advantageously, within the holding section is arranged a device for weight relief, the device for weight relief being mounted by bearing arms on the pivot shaft. By this means a further concentration of the functionality of the centre arm on a single pivot shaft is achieved, so that the design of the centre arm becomes even more compact and is additionally stabilised.

A further preferred embodiment is characterised in that on the pivot shaft is arranged a device for fixing the holding section relative to the supporting section. This enables direct and leverage-free coupling of the fixing device to the pivot shaft. To put it another way, the fixing device acts directly in the pivot range, so that exact and stable fixing is ensured.

The object is also achieved by a contact grilling or roasting device of the kind mentioned hereinbefore by the fact that the centre arm is designed according to any one of claims 1 to 8. The resulting advantages have already been described in connection with the centre arm, so that reference is made to the corresponding passages to avoid repetition.

BRIEF DESCRIPTION OF THE DRAWINGS

Further appropriate and/or advantageous features and developments are apparent from the subsidiary claims and the description. A particularly preferred embodiment is described in more detail with the aid of the attached drawings. The drawings show:

BRIEF DESCRIPTION OF THE EMBODIMENTS

The centre arm shown in the figures serves as a conversion kit or, in combination with an upper contact grilling or roasting plate, as an independent grilling or roasting device, and can be used on its own or in combination with a lower contact grilling or roasting plate to form a contact grilling or roasting device.

Figure 1:
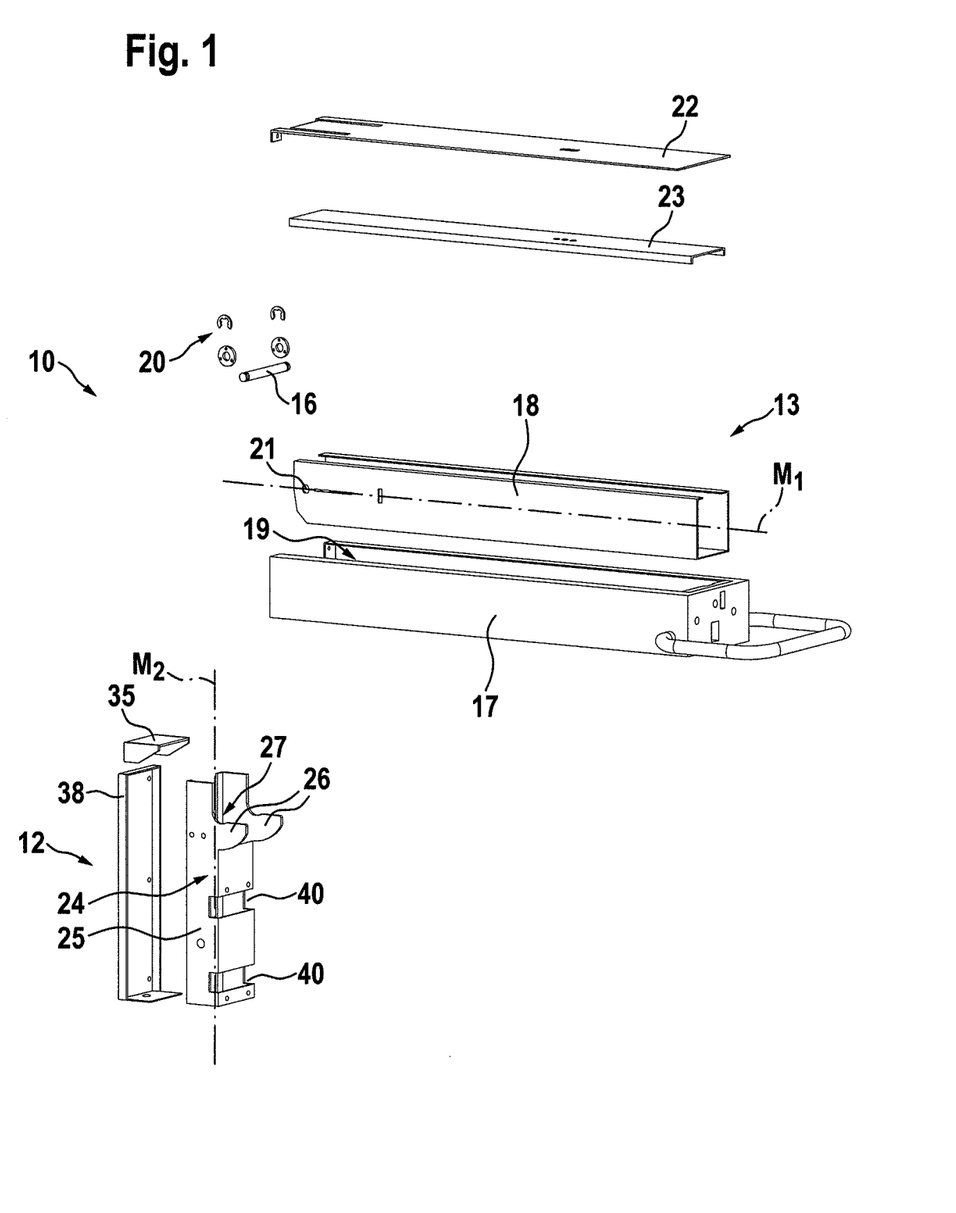
FIG. 1 an exploded view of a centre arm according to the invention.

FIG. 1 shows an exploded view of the centre arm 10 which is constructed and designed to receive an upper contact grilling or roasting plate 11. The centre arm 10 essentially consists of a vertical supporting section 12 and a holding section 13 arranged pivotably on the supporting section 12. The term "vertical supporting section 12" means that the supporting section 12 is oriented perpendicularly to a plane E usually spanned by a table, a base or the like or by a lower contact grilling or roasting plate 14, expressly also including an orientation which is slightly inclined from the perpendicular. The upper contact grilling or roasting plate 11 can be attached to the holding section 13.

The supporting section 12 is preferably arranged stationarily in the region of a frame 14, a lower contact grilling or roasting plate 15 or the like. The holding section 13 is arranged so as to be relatively movable to the supporting section 12, namely in particular pivotable out of an (open) filling position into a (closed) grilling or roasting position and vice versa. For this purpose the supporting section 12 and the holding section 13 are connected to each other by a pivot shaft 16. The pivot shaft 16 is designed and arranged approximately at the point of intersection S of the centre axis $M_2$ of the supporting section 12 with the centre axis $M_1$ of the holding section 13. Specifically, in particular the centre axes $M_1$ and $M_2$ from the side view in FIG. 1 are meant. The description "approximately at the point of intersection" further means that not only is exactly the point of intersection S possible as the position for the pivot shaft 16, but expressly also a position of the pivot shaft 16 which is located slightly to the side of the point of intersection S, namely in the region of the point of intersection S.

The centre arm 10 includes a housing 17. Within the housing 17 is arranged an inner housing 18. Both the housing 17 and the inner housing 18 are preferably exclusively linearly elongate and of right parallelepiped cross-section. Naturally, other designs and in particular cross-sectional shapes are possible. The inner housing 18 is clearly narrower than the housing 17, such that the inner chamber 19 of the housing 17 is divided into several chambers which preferably extend in the longitudinal direction of the holding section 13. The pivot shaft 16 is preferably mounted rotatably in or on the inner housing 18. By suitable locking means 20, for example spring rings or the like, the pivot shaft 16 is fixed in bearing seats 21, namely e.g. bores, of the inner housing 18. But optionally the pivot shaft 16 can also be mounted in or on the housing 17 itself. Optionally, the housing 17 is closable with a cover 22 which can be designed as a pivot or sliding cover or in some other suitable manner. Particularly preferably, the inner housing 18 is additionally closable with a separate cover 23. As a result several, namely preferably three, independent chambers encapsulated by each other can be formed.

The supporting section 12 is preferably composed of two half-shells. One half-shell is designed as a bearing support 24 for the pivot shaft 16. The bearing support 24 shown e.g. in FIG. 1 has a vertically directed and linearly extending section 25 as well as two supporting arms 26. The supporting arms 26 form, in a groove 27 formed between them and the section 25, a bearing seat for the pivot shaft 16. The centre axis $M_2$ in this case relates to the total width of the supporting section 12 formed or defined by the section 25 and the supporting arms 26. Further, the section 25 optionally includes further recesses which are constructed and designed for the engagement of fastening elements, for example struts of the frame 14 or components of the lower contact grilling or roasting plate 15. Not shown but belonging to the supporting section 12 is the second half-shell which is constructed and designed as a bearing cover for fixing the pivot shaft 16. Naturally, other components which receive the pivot shaft 16 can be used as well. In particular, the supporting section 12 can be constructed in one or more parts. Crucial is the design or arrangement of the bearing seats for the pivot shaft 16 on the centre axis $M_2$ or, with slight deviations therefrom, directly beside it.

Figure 2:
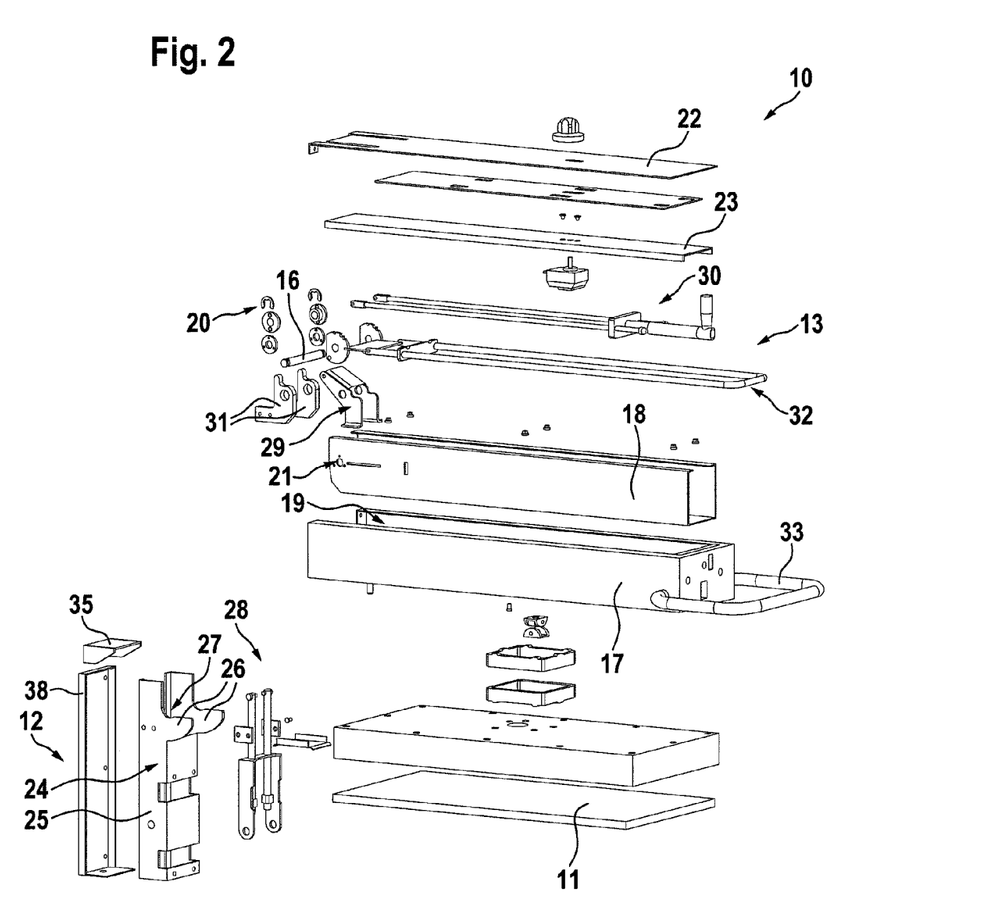
FIG. 2 an exploded view of a centre arm carrying an upper contact grilling or roasting plate, FIG. 3 a side view of a centre arm on which is arranged an upper contact grilling or roasting plate, FIG. 4 a perspective view of the pivot range of the centre arm obliquely from the front, FIG. 5 a perspective view of the pivot range obliquely from the rear, and FIG. 6 a side view of a contact grilling or roasting device.
Figure 3:
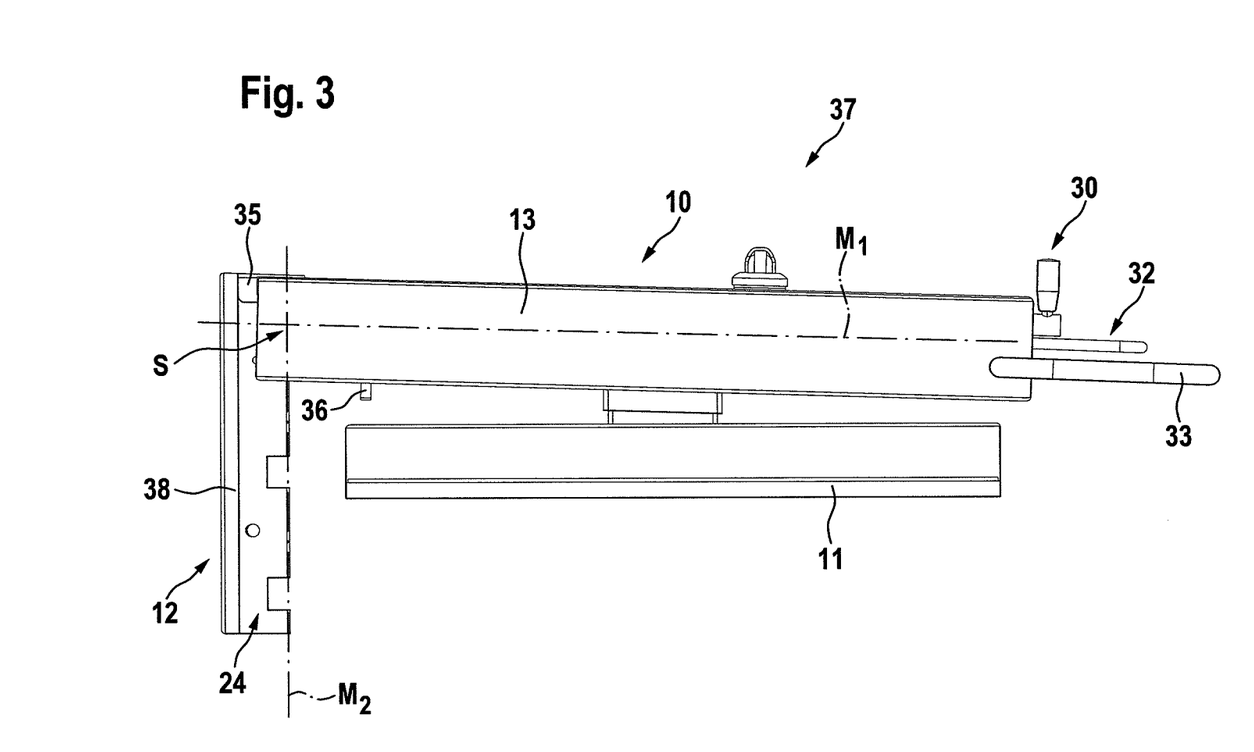
Figure 4:
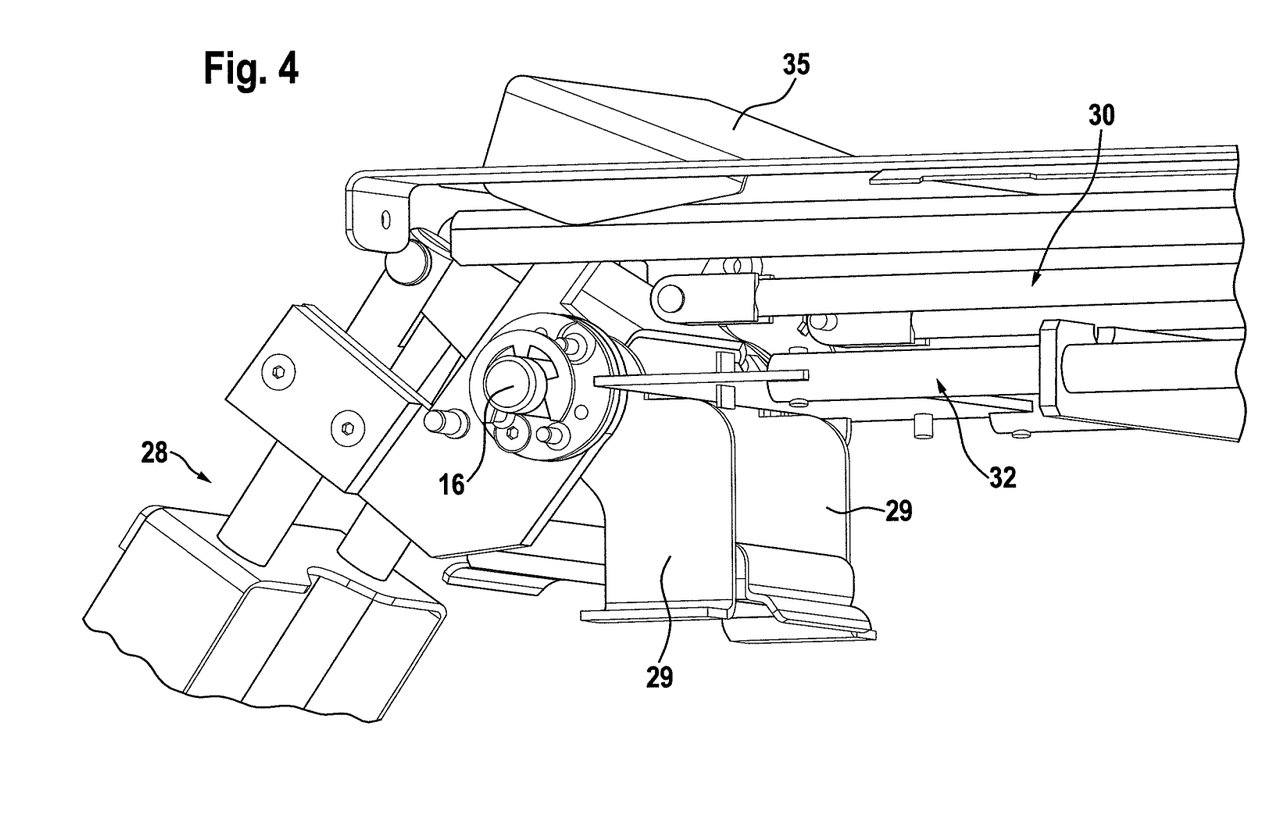
Figure 5:
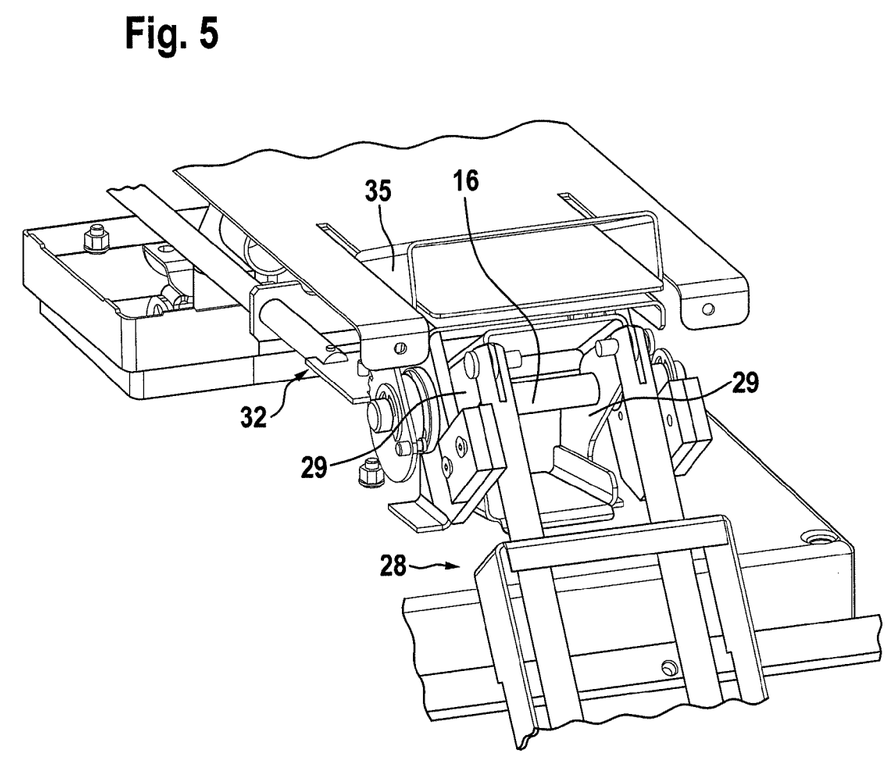

As can be seen from FIG. 2, the centre arm 10 according to the invention can further have a device 28 for weight relief, the device 28 for weight relief being arranged within the supporting section 12 and mounted by link elements 29 on the pivot shaft 16. The bearing support 24 of the supporting section 12 can then be closed with a cover 38. A further option provides that a device 30 for weight relief is likewise arranged within the holding section 13, the device 30 for weight relief being mounted by bearing arms 31 on the pivot shaft 16. On the pivot shaft 16 can also be arranged a device 32 for fixing the holding section 13 relative to the supporting section 12 in customer-specific latch positions. The combination of various functions, namely in particular the devices 28 and 30 for weight relief as well as the fixing device 32, can also be seen in FIGS. 4 and 5.

Associated with the holding section 13 is a handle 33 or the like for performing the pivot movement, which is preferably arranged in the region of the end face of the holding section 13. But other actuating elements and arrangements or positionings are possible likewise.

Figure 6:
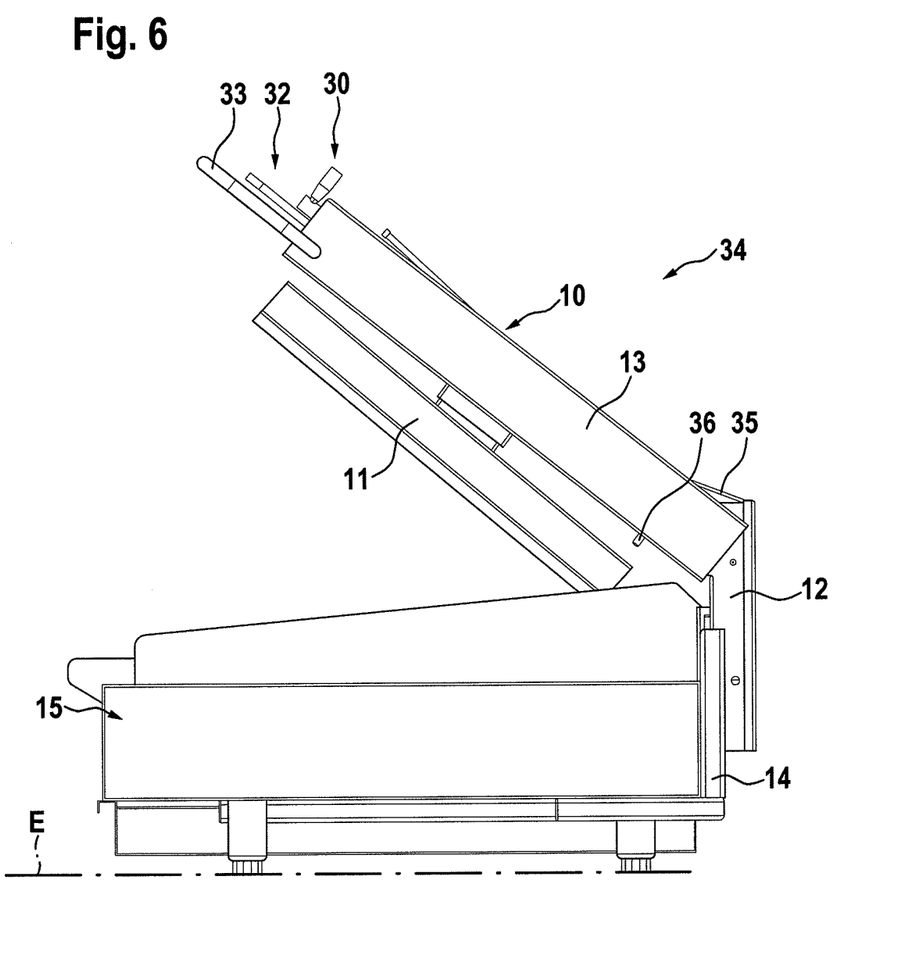

In FIG. 6 can be seen a complete contact grilling or roasting device 34 having an upper contact grilling or roasting plate 11 and a lower contact grilling or roasting plate 15, the upper contact grilling or roasting plate 11 being pivotably attached by the centre arm 10 to the frame 14 or directly to the lower contact grilling or roasting plate 15. The pivot range between the holding section 13 and the supporting section 12 is preferably covered with a pivotably mounted flap 35 or the like. Optionally, between the holding section 13 and the upper contact grilling or roasting plate 11 can be arranged at least one spacer 36. But the centre arm 10 together with the upper contact grilling or roasting plate 11 can also be used as an independent grilling or roasting device 37, in particular as a conversion kit.

The invention claimed is:

1. A centre arm for holding an upper grilling or roasting plate, comprising: a vertically directed supporting section and a holding section, wherein the holding section is pivotably arranged on the vertically directed supporting section and adapted to be connected to the upper grilling or roasting plate, wherein the holding section includes a pivot shaft positioned approximately at a point of intersection of a centre axis of the holding section and a centre axis of the vertically directed supporting section, wherein the holding section includes a housing and an inner housing arranged within the housing, wherein the pivot shaft is mounted in the inner housing of the holding section, and wherein the inner housing divides an inner chamber of the housing into several chambers directed in a longitudinal direction of the centre arm.

2. The centre arm of claim 1, wherein both the inner housing and the housing have a separate cover.

3. The centre arm of claim 1, wherein the vertically directed supporting section comprises two half-shells,
   wherein one of the two half-shells serves as a bearing support for the pivot shaft and the other of the two half-shells serves as a bearing cover for fixing the pivot shaft.

4. The centre arm of claim 1, wherein the vertically directed supporting section includes a weight device for weight relief mounted by link elements on the pivot shaft.

5. The centre arm of claim 1, wherein the holding section includes a weight device for weight relief mounted by bearing arms on the pivot shaft.

6. The centre arm of claim 1, further including a fixing device arranged on the pivot shaft to fix the holding section relative to the vertically directed supporting section.

7. A contact grilling or roasting device, comprising: at least one upper contact grilling or roasting plate and a lower contact grilling or roasting plate; and a centre arm comprising a vertically directed supporting section and a holding section, wherein the holding section is pivotably arranged on the vertically directed supporting section and adapted to be connected to the upper grilling or roasting plate, wherein the holding section includes a pivot shaft positioned approximately at a point of intersection of a centre axis of the holding section and a centre axis of the vertically directed supporting section, and wherein the holding section includes a housing and an inner housing arranged within the housing, wherein the pivot shaft is mounted in the inner housing of the holding section; wherein the centre arm is configured to pivotably arrange the upper contact grilling or roasting plate on the lower contact grilling or roasting plate, and wherein the inner housing divides an inner chamber of the housing into several chambers directed in a longitudinal direction of the centre arm.

* * * * *